United States Patent [19]

Seshimo et al.

[11] Patent Number: 5,139,197
[45] Date of Patent: Aug. 18, 1992

[54] AIR CONDITIONING SYSTEM

[75] Inventors: Yu Seshimo; Hideo Igarashi, both of Kamakura; Tetsuji Okada, Shizuoka, all of Japan

[73] Assignee: Mitsubishi Denki Kabushiki Kaisha, Tokyo, Japan

[21] Appl. No.: 581,790

[22] Filed: Sep. 13, 1990

[30] Foreign Application Priority Data

Dec. 7, 1989 [JP] Japan .................. 1-318139
Dec. 7, 1989 [JP] Japan .................. 1-318145

[51] Int. Cl.$^5$ .............................. F24F 7/00
[52] U.S. Cl. ............................ 236/49.3; 236/94
[58] Field of Search ............ 236/49.3, 94; 165/11 R

[56] References Cited

U.S. PATENT DOCUMENTS

| | | |
|---|---|---|
| 4,406,397 | 9/1983 | Kamata et al. ............ 165/22 X |
| 4,821,526 | 4/1989 | Otsuka et al ................ 62/180 |
| 4,948,040 | 8/1990 | Kobayashi et al. ......... 236/94 X |

FOREIGN PATENT DOCUMENTS

| | | |
|---|---|---|
| 3703401 | 8/1988 | Fed. Rep. of Germany . |
| 59-136543 | 9/1984 | Japan . |
| 60-47497 | 10/1985 | Japan . |
| 62-217043 | 9/1987 | Japan . |

OTHER PUBLICATIONS

Recknagel, Sprenger, Honmann: Tashchenbuch fur Heizung and Klimatechnik 1986/1987, p. 898 (article).

Primary Examiner—William E. Wayner
Attorney, Agent, or Firm—Oblon, Spivak, McClelland, Maier & Neustadt

[57] ABSTRACT

In an air conditioning system of the type having air volume to each room controlled by individual dampers the improvement comprising a damper control unit for, on a trial mode, gradually changing the opening angle of each damper while the other dampers are kept fully closed; air volume measurement unit for detecting the air volume from a blower to measure the actual air volume; pressure difference measurement unit for detecting a difference in pressure between the outlet air and the inlet air of an indoor heat exchanger unit to measure an air feeding pressure difference with respect to an actual duct system; air volume calculation unit for finding the relationship among the air volume passing through the respective dampers, the opening angles of the respective dampers and the air feeding pressure difference, based on outputs from the pressure difference measurement unit, the air volume measurement unit and the damper control unit, to find air feeding resistance in the respective ducts.

2 Claims, 6 Drawing Sheets

AIR CONDITIONING SYSTEM

The present invention relates to a duct type of air conditioning system which employs a variable air volume control system which can independently control the temperatures in a plurality of rooms. More specifically, the present invention relates to an air conditioning system which can detect a difference in its duct resistance and estimate the air volume in a terminal duct.

There has been known a conventional variable air volume control type of air conditioning system wherein a blower distributes and supplies selectively cooled and heated air to a plurality of rooms through a duct which comprises a main duct and branch ducts. The branch ducts which extend from the main duct to the respective rooms usually have different length from one another. As a result, the branch ducts are different from one another in terms of conditioned air feeding resistance. The air feeding resistance in the respective ducts is influenced by poor duct installation, such as deformation in the shape of the ducts in section, or the presence of foreign materials in the ducts.

In these cases, particularly in the latter case, if the pressure in a common conditioned air feeding passage, i.e., the origin of the duct is detected and the operation of the blower is controlled based on such detection, it is difficult to obtain a fine air feeding control for each room, consequently a fine temperature control in each room because the presence of a difference in pressure loss at downstream portions of the duct is ignored.

The conventional arrangement is to detect the pressure at the origin of the duct, i.e., the pressure of conditioned air which has not reached the respective rooms yet, and to control the operation of the blower based on such detection.

An example of the conventional arrangement is disclosed in "REITO KUCHO BINRAN" (New Edition, the 4th Print, Section "Application") issued by NIHON REITO KYOKAI. The operation of the conventional arrangement will be described based on the illustration 2.10 (a) which is described on page 41 of Chapter 2 "AIR CONDITIONING SYSTEM" of the article as just referred to.

FIG. 6 of the accompanying drawings is a schematic diagram showing the structure of the conventional air conditioning system which is described in that article.

In FIG. 6, reference numeral 1 designates rooms to be air conditioned, the number of which is four in this FIG.. Reference numeral 2 designates an indoor unit which is arranged in a ceiling and the like of the air conditioned rooms 1 and which functions as a conditioned air feeding source for selectively cooled and heated air. Reference numeral 3 designates an air filter which removes dirt and dust in air to purify it. Reference numeral 4 designates a heat exchanger which can selectively cool and heat the air. Reference number 5 designates a blower which feeds the cooled and heated air to the rooms. The indoor unit 2 is constituted by the air filter 3, the heat exchanger 4 and the blower 5. Reference numeral 6 designates a main duct which extends from the outlet of the indoor unit 2. Reference numeral 7 designates a plurality of branch ducts which branch from the main duct 6 to the air conditioned rooms 1, and the number of which corresponds to that of the air conditioned rooms. Reference numeral 8 designates throttle type of air feeding adjusting units which are arranged in the respective branch ducts 7 and which can adjust the air volume to the respective air conditioned rooms 1. Reference numeral 9 designates dampers which are rotatably mounted in the respective air feeding adjusting units 8. Reference numeral 10 designates outlet ports which are arranged at the terminals of the respective branch ducts 7. Reference numeral 11 designates intake ports, each of which is formed in a lower portion of the door of each air conditioned room 1. Reference numeral 12 designates an intake port which is formed in a ceiling surface of hallway which is outside the air conditioned rooms 1. Reference numeral 13 designates an intake duct which connects between the intake port 12 in the ceiling surface and the inlet of the indoor unit 2. Reference numeral 14 designates room thermostats which are arranged in the respective air conditioned rooms 1 and which are used to set desired room temperatures and to detect actual room temperatures. Reference numeral 15 designates a temperature detector which is arranged in the main duct 6 to detect the temperature of conditioned air fed from the blower 5. Reference numeral 16 designates a pressure detector which is arranged in the main duct 6 to detect the wind pressure caused by the controlled air fed from the blower 5. Reference numeral 17 designates a heat source device such as a heat pump, which is connected to the heat exchanger 4 and controls the heat exchanging operation of the heat exchanger 4.

The conventional duct type of centralized air conditioning and heating system is constructed as stated above, and includes a centralized conditioned air feeding device which can produce selectively cooled and heated air in the heat exchanger 4, and delivers such air to the respective air conditioned rooms 1 through the main duct 6 and/or the branch ducts 7, and the throttle type of air feeding adjusting units 8 as air feeding adjusting devices, which are arranged in the respective branch ducts 7 to adjust the air volume of the cooled and heated air to the respective air conditioned rooms 1 by controlling the opening angles the dampers 9.

Next, the operation of the conventional air conditioning system having such structure will be explained.

The opening angle of the damper 9 of each air feeding adjusting unit 8 is suitably adjusted, respectively, depending on a temperature difference between a desired room temperature set by a user through each room thermostat 14 and the actual room temperature detected by the room thermostat at that time. The pressure in the main duct 6 varies depending on the opening angles of the dampers 9. A change in the pressure in the main duct is detected by the pressure detector 16. Based on the detection by the pressure detector, the air volume produced by the blower 5 can be adjusted so as to obtain a predetermined set pressure. In addition, the change in the air volume can lead the temperature of the conditioned air at the outlet of the heat exchanger 4 to change. The change in the temperature of the conditioned air at the outlet of the heat exchanger 4 is detected by the temperature detector 15, and the capacity of the heat source device 17 can be controlled to obtain a predetermined set temperature for the conditioned air.

Such a sequence of controls allow the conditioned air to be substantially at a certain temperature, and allow the conditioned air having a suitable volume and a suitable temperature to be blown off from the outlet ports 10 into the air conditioned rooms 1 at such amounts of air volume that are depending on the magnitude of the heat loads in the respective air conditioned rooms 1.

The air which has selectively air conditioned and heated the inside of the respective air conditioned rooms 1 passes through a space such as a hallway from the intake ports 11 formed in the doors, and flows into the intake port 12 formed in the ceiling. Then, it returns to the indoor unit 2 through the intake duct 13. The air that has returned to the indoor unit repeats similar flows in accordance with the operations as just stated.

As explained, the conventional duct type of centralized air conditioning and heating system wherein the throttle type of air feeding adjusting units 8 are employed determines the optimum value for the temperature of the conditioned air and the optimum value for the pressure of the conditioned air depending on the variation in the heat loads in the respective air conditioned rooms 1. The capacity of the heat source device 17 and that of the blower 5 can be controlled as each optimum value substantially become constant.

In the conventional air conditioning system described above, the control of the air volume produced by the blower 5 is carried out based on a pressure change in the main duct 6 which is caused when the conditioned air is fed.

The control wherein the air volume of the conditioned air is adjusted by the blower 5 based on pressures detected at the origin of the main duct 6 to maintain the pressure at that location constant can not maintain in a suitable manner the air volume which passes through the respective branch ducts, i.e., the air volume which is fed to the respective air conditioned rooms 1 because the respective branch ducts have different air feeding resistance from one another.

In addition, if the branch ducts include an air feeding obstacle due to poor duct installation, such as deformation in the shape of the ducts in section, or the presence of foreign materials in the ducts, it is especially difficult to maintain a suitable feeding air volume to each air conditioned room 1.

Incidentally, Japanese Examined Patent Publication No. 47497/1985 has disclosed an air conditioning system whose operation is carried out independently of the pressure change in the main duct 6. This system provides a function as a wind speed sensor for air volume control units at the outlet ports of the duct of the system, in order to control the blower 5 and the like. In the system, when the air feeding adjusting unit that has the worst air feeding conditions due to the full opening of its damper 9 feeds an output below a set air volume, the air volume given by the blower 5 is increased based on detecting such output. In this way, the blower 5 can be always controlled to exhibit at least sufficient capacity.

Although, the solution disclosed in the publication can obtain a suitable air volume at each outlet port, the air volume control units and so on are extensive and extremely expensive due to the presence of the wind speed sensors. The number of the terminal devices in such air conditioning system is normally about 5–15. Whether the cost of the terminal devices is expensive or economical is an extremely important factor.

It is an object of the present invention to eliminate the disadvantage of the conventional air conditioning system and to provide a new and improved air conditioning system capable of controlling the capacity of a blower in a suitable manner by employing a simple structure and simple devices.

The foregoing and other objects of the present invention have been attained by providing an air conditioning system comprising a centralized air feeding device including an indoor unit with a heat exchanger in it, a main duct and branch ducts connected to the main duct, the centralized air feeding device heat exchanging air by the heat exchanger, and delivering the heat exchanged air to a plurality of rooms to be air conditioned by a blower through the main duct and the branch ducts; air feeding adjusting devices which are arranged in the respective branch ducts and includes dampers, respectively, the air feeding adjusting devices adjusting the air volume of selectively cooled and heated air to the air conditioned rooms by controlling the opening angles of the dampers; damper control means for, on a trial mode, gradually changing the opening angle of the damper for each air feeding adjusting device while the other dampers are kept fully closed; air volume measurement means for detecting the air volume from the blower to measure the actual air volume; pressure difference measurement means for detecting a difference in pressure between the outlet air and the inlet air of the centralized air feeding device to measure an air feeding pressure difference with respect to the actual duct system; and air volume calculation means for finding the relationship among the air volume passing through the respective air feeding adjusting devices, the opening angles of the respective dampers and the air feeding pressure difference, based on outputs from the pressure difference measurement means, the air volume measurement means and the damper control means, to find air feeding resistance in the respective ducts. The air volume calculation means may be constituted so as to obtain initialization information on the air flow control, which is required to find the air feeding resistance in the respective ducts. In this latter case, the air conditioning system further comprises initialization information obtaining means which is constituted by the damper control means, the pressure difference measurement means and the air volume calculation means to obtain the initialization information; and initialization information storing means for storing the initialization information.

In accordance with the air conditioning system of the present invention, on the trial mode, the damper control means gradually changes the opening angle of the damper for each air feeding adjusting device while the other dampers are kept fully closed.

At that time, the air volume measurement means measures the air volume from the blower through the air volume detector, and the pressure difference measurement means measures the pressure difference between the outlet air and the inlet air of the indoor unit through the pressure differential detector. The air volume calculation means finds a tabulated or formulated relationship based on the opening angle information on the dampers from the damper control means, the air volume information from the air volume measurement means and the air feeding pressure difference information by the pressure difference measurement means. Such sequence of operations are repeated by the number of the air feeding adjusting devices, so that information on how to control the air feeding pressure difference and the opening angle of the dampers of the air feeding adjusting devices in order to deliver a predetermined air volume to the respective branch ducts is accumulated in sequence. On the other hand, on an actual operation mode (air conditioning and heating mode), the blowers, and the opening angles of the dampers of the air feeding adjusting devices are controlled in a suitable manner based on such information, thereby allowing selectively cooled and heated air to be fed the respective rooms depending on their set air volume.

Now, the present invention will be described in detail with reference to preferred embodiments illustrated in the accompanying drawings.

Figure 1:
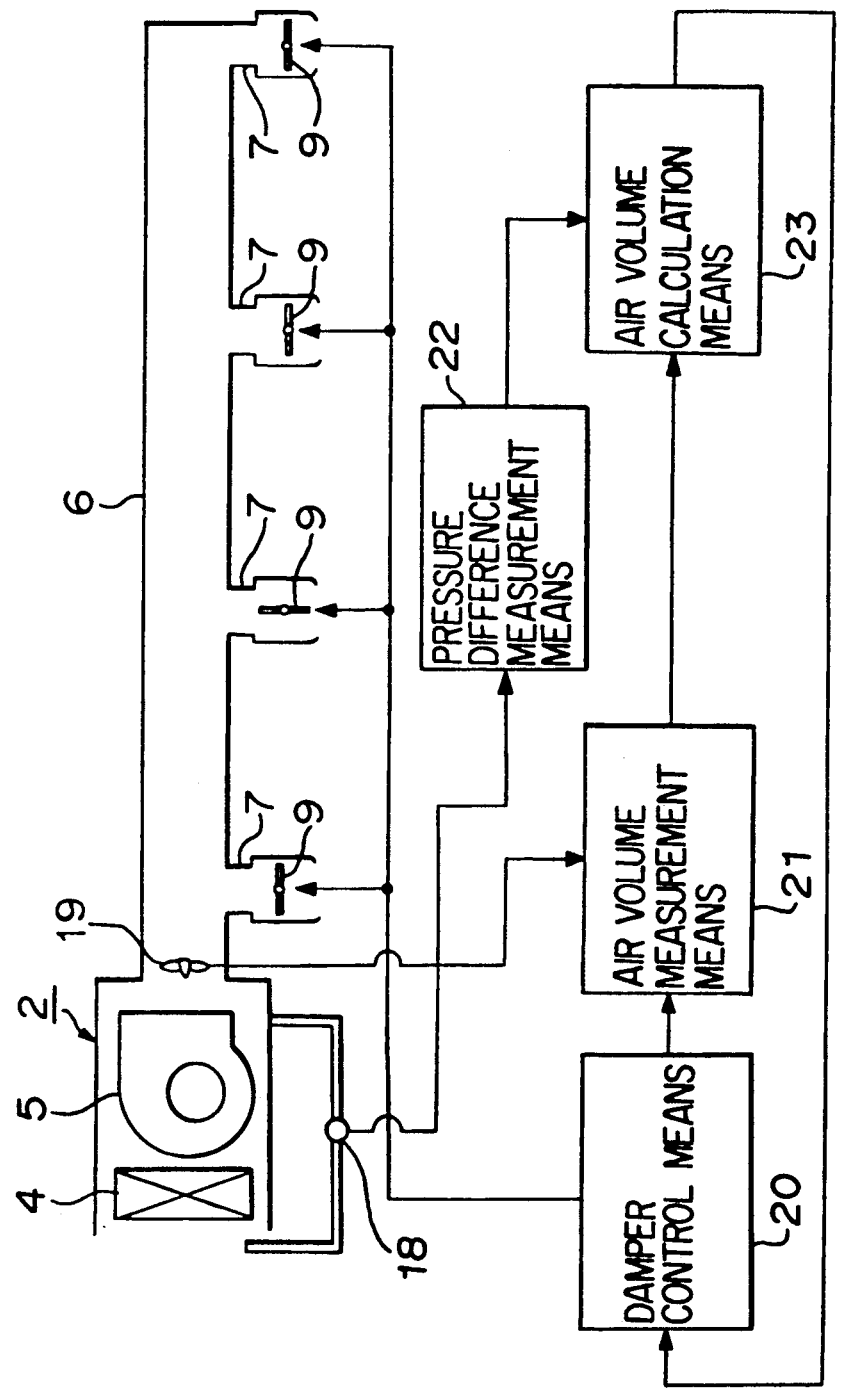
FIG. 1 is a schematic diagram showing the entire structure of a first embodiment of the air conditioning system according to the present invention.
Figure 6:
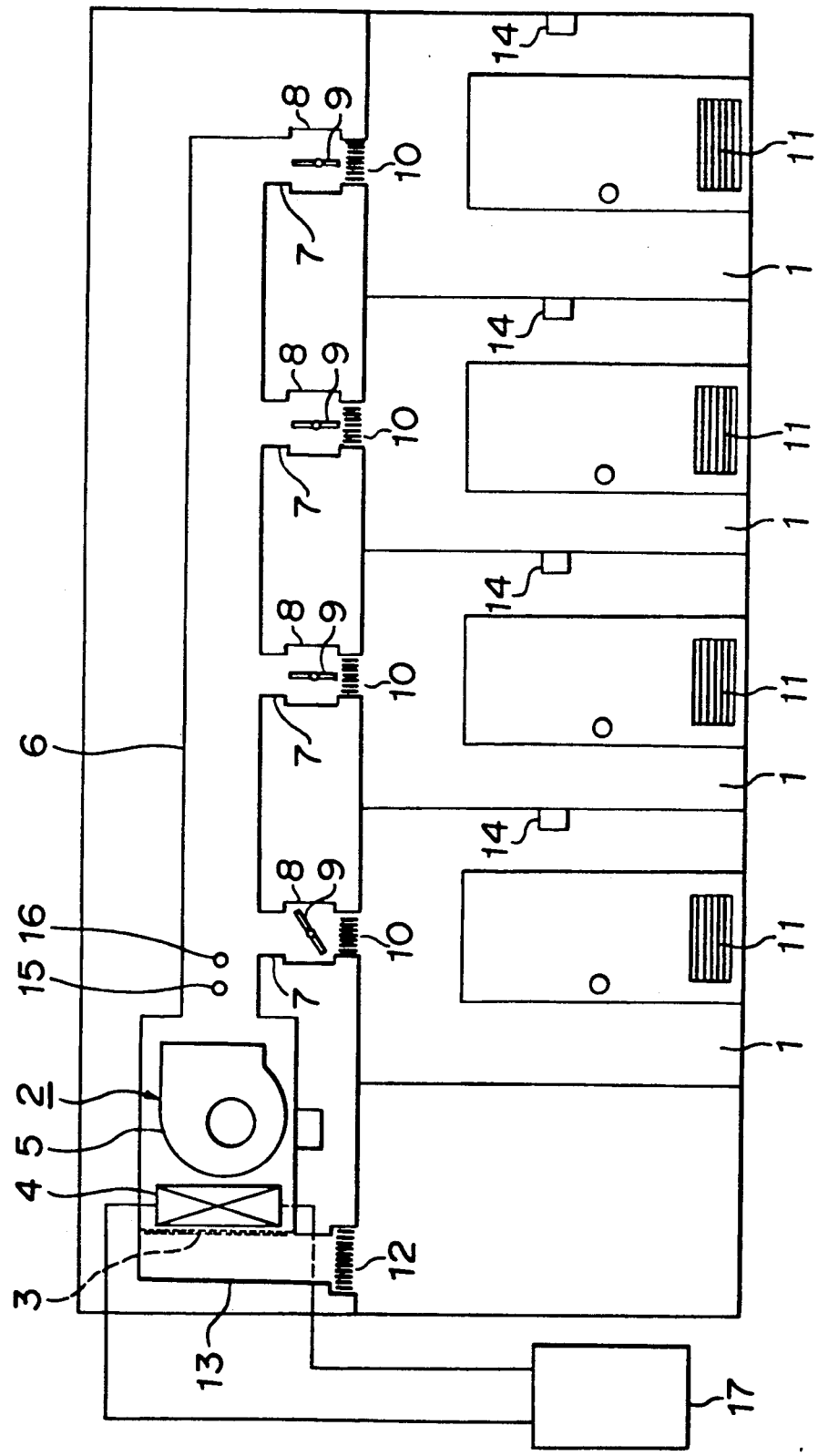
FIG. 6 is a schematic diagram showing the entire structure of the conventional air conditioning system.

FIG. 1 is a schematic drawing showing the entire structure of a first embodiment of the air conditioning system according to the present invention. Because the parts which are designated by reference numerals 2, 4 through 7 and 9 in FIG. 1 are similar to those of the conventional air conditioning system of FIG. 6, explanation on those parts will be omitted for the sake of clarity. Like the conventional air conditioning system, the air conditioning system according to the present invention includes a centralized air feeding device wherein the heat exchanger 4 selectively cools and heats air, and the conditioned air is delivered as cooled air and heated air to a plurality of air conditioned rooms 1 through the main duct 6 and the branch ducts 7; and an air feeding adjusting devices which are arranged in the respective branch ducts 7 to adjust the air volume of the cooled air and the heated air to the respective air conditioned rooms 1 by controlling the opening angles of the dampers 9. Because the operation of the air conditioning system according to the present invention on an operation mode is similar to that of the conventional air conditioning system, a trial mode of the air conditioning system of the present invention will be described in detail.

In FIG. 1, reference numeral 18 designates a pressure differential detector which detects the pressure difference between the outlet air and the inlet air of the indoor unit 2 which is constituted by the heat exchanger 4 and the blower 5, both parts being forming the centralized air feeding device. Reference numeral 19 designates an air volume detector which is arranged at the origin of the main duct 6 to detect the air volume given by the blower 5. Reference numeral 20 designates a damper control means which controls the opening angles of the dampers 9 in the respective air feeding adjusting devices. The dampers 9 are provided with their driving devices (not shown) which can independently control the opening angles of the dampers 9. Each driving device is actuated depending on an opening angle signal from the damper control means 20, and thus controls the opening angle of its corresponding damper 9. Reference numeral 21 designates an air volume measurement means which measures the actual air volume based on a detection signal from the air volume detector 19. Reference numeral 22 designates a pressure difference measurement means which measures the actual pressure difference between the outlet air and the inlet air based on a detection signal from the pressure differential detector 18. Reference numeral 23 designates an air volume calculation means which calculates the relationship among the air volume passing through the air feeding adjusting devices, the opening angles of the dampers 9 and the pressure difference between the outlet air and the inlet air, based on outputs from the pressure difference measurement means 22, the air volume measurement means 21 and the damper control means 20. The air volume calculation means 23 receives a measured air volume output from the air volume measurement means 21, a measured pressure differential output from the pressure difference measurement means 22, and an opening angle information output on the damper in question from the damper control means 20. The air volume calculation means 23 performs arithmetic and logical operations, and evaluation on the relationship, and puts the relationship into tabular form or formulation, thereby to calculate the air feeding resistance in the respective branch ducts.

Figure 2:
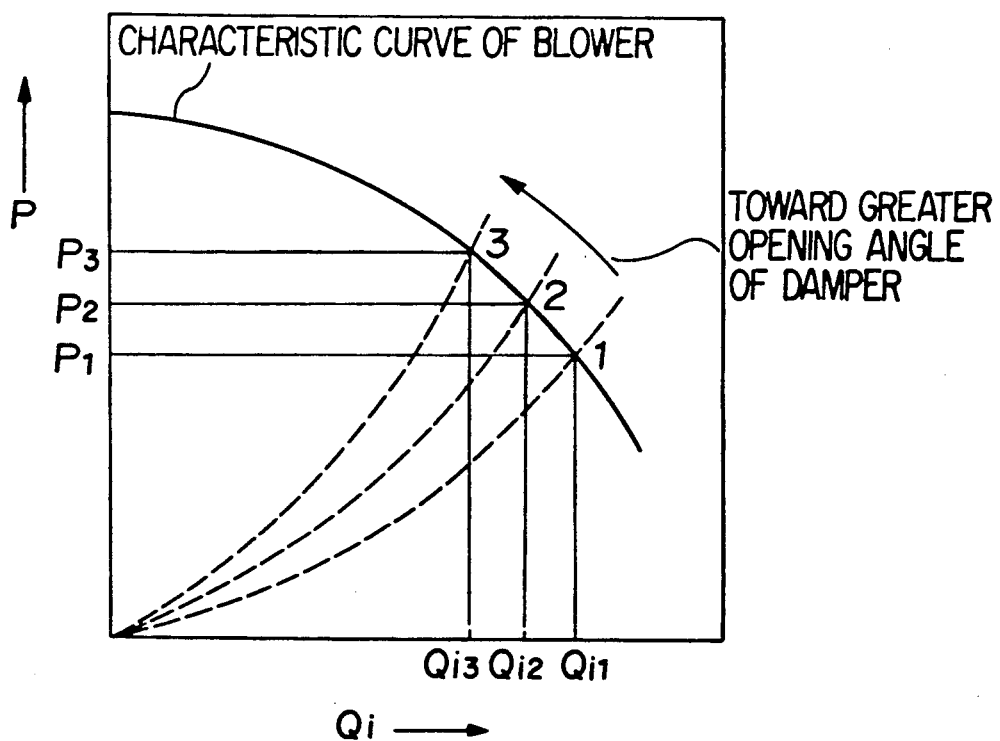
FIG. 2 is a graph showing air feeding characteristics to indicate the relationship between the air volume given by a blower and feeding air pressure differences, which is employed in the operation of the first embodiment.

An example of the functions and operations of the air volume calculation means 23 of the air conditioning system constructed as stated above will be described in reference to FIG. 2. FIG. 2 is a graph of air feeding characteristics showing the relationship of the air volume given by the blower to the pressure difference between the outlet air and the inlet air, which is employed in the operations of the first embodiment.

In FIG. 2, the axis of ordinates represents an air feeding pressure difference P which can be found from the pressure difference caused by the blower 5 between the outlet air and the inlet air of the indoor unit 2. The air of abscissae represents an air volume Q. The characteristic curve of the blower 5 is shown in a solid line. Resistance curves showing air feeding resistance in any one of the branch ducts 7 leading to the lated damper 9 are shown in dotted lines. Parameters affixed to the dotted lines represent the opening angles D of the damper 9. The characteristic curve represented by the solid line is given when the revolution of the blower 5 is fixed at predetermined value. In addition, the resistance curves showing the air feeding resistance in the branch duct 7 and the like change as shown depending on the opening angles D of the damper 9.

In case of using such characteristic curves, the opening angle D of the damper 9 of any one of the air feeding adjusting devices in the first embodiment is gradually stepwise changed while the other dampers 9 are kept fully closed. The relationship among the feeding air pressure difference P, the air volume Qi and the opening angle Di of the damper 9 can be found by measuring air volume Qi1, Qi2 and Qi3, and air feeding pressure differences P1, P2 and P3 corresponding to each air volume, which are given by such stepwise change of the opening angle of the damper 9.

If the air volume is Qi1, and the feeding air pressure difference is P1 provided that the opening angle of any one of the dampers 9 is Di and that the other dampers 9 are kept fully closed, point 1 is located at the intersection of the air feeding characteristic curve of the blower 5 and the resistance curve at that time. In other words, P1 indicates the pressure difference caused by the blower 5 between the outlet air and the inlet air of the indoor unit 2, P1 is also equal to the air feeding resistance of the duct passage including the damper 9 at the time when the air volume is Qi1.

In accordance with the solution of the present invention, the air feeding resistance in the duct passage can be found more accurately in comparison with the conventional solution wherein the air feeding resistance is found based on only the pressure in the duct. This is because in the latter solution, the pressure at the inlet of the indoor unit is not taken into account, and the air feeding resistance in the duct passage is found based on only the pressure at the outlet of the indoor unit.

Similar operation is carried out with respect to the dampers 9 of the other air feeding adjusting devices, and the relationship among the air feeding pressure difference P, the air volume Qi and the opening angle Di of the damper in each air feeding passage can be put in tabular form or formulation.

The results thus tabulated or formulated can be utilized to find the respective air volumes Q, regarding the air feeding pressure difference P and the opening angle Di of the damper 9 of each air feeding adjusting device as being known. Or the air volume which is passing through each air feeding adjusting device can be preset to find the opening angle Di of each damper 9 with respect to the air feeding pressure difference P in the indoor unit 2.

Means such as the air volume calculation means 23 can be provided in an air conditioning system to obtain precise air feeding control in the respective rooms, which has been demanded heretofore, by controlling the capacity of the blower 5 based on the air volume and the opening angle of each damper 9. An air conditioning system with such air volume calculation means 23 provided in it can realize precise air feeding control in the respective rooms to be air conditioned without providing the respective air feeding adjusting devices with such air volume sensing function as disclosed in the Japanese Examined Patent Publication No. 47497/1985 which has been discussed as prior art.

Figure 3:
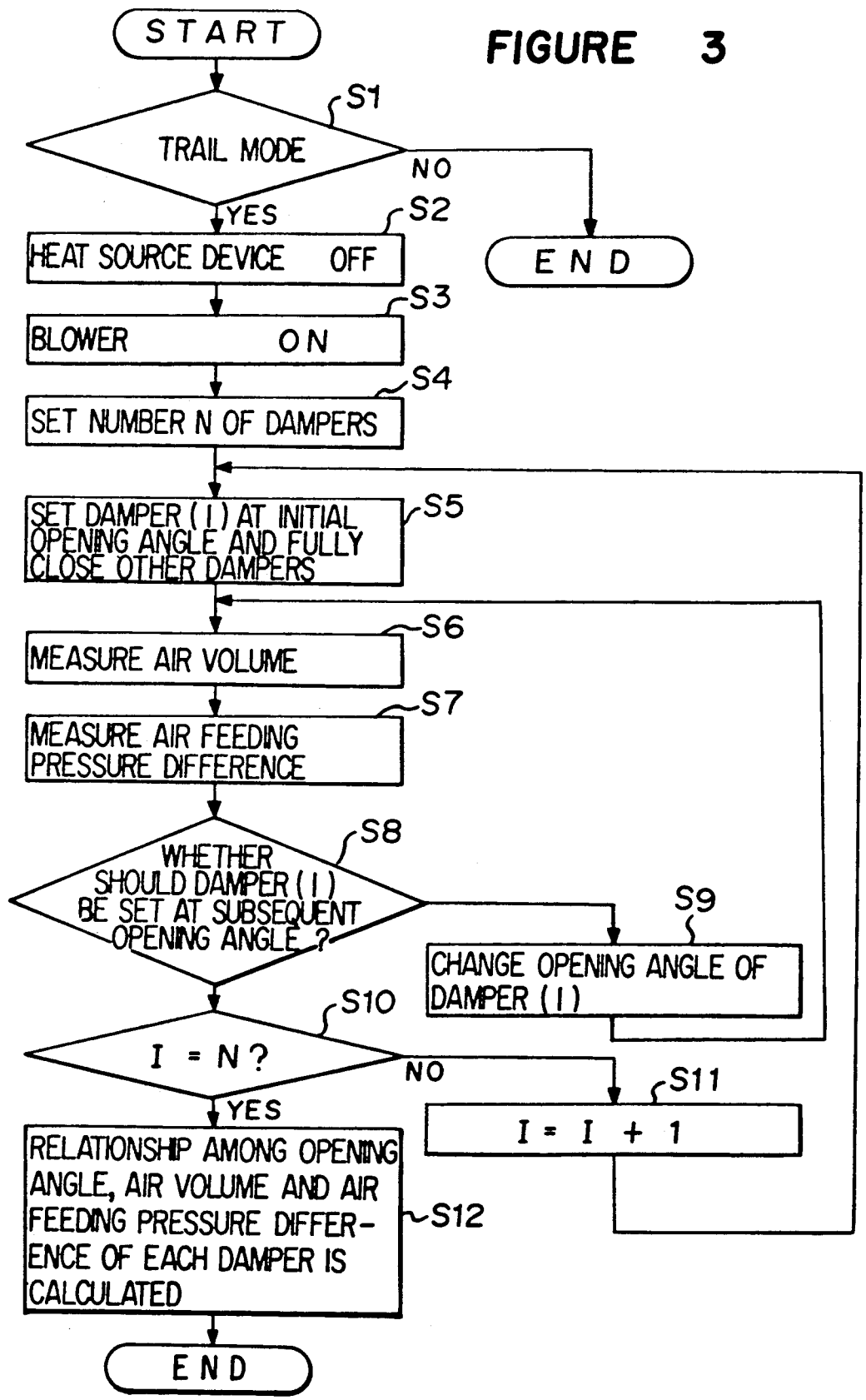
FIG. 3 is a flow chart showing the operations in a trial mode in the first embodiment.

Next, the operation of the first embodiment of the air conditioning system according to the present invention will be described with reference to FIG. 3. FIG. 3 is a flow chart showing the operation of the first embodiment under the trial mode. In the operation, a microcomputer is utilized, and the trial mode is selected to call the routine shown in FIG. 3. Explanation on the control circuit of the microcomputer will be omitted.

When the operation mode of the air conditioning system is shifted to the trial mode, the operation control of the air conditioning system will be carried out in accordance with the following routine:

At Step S1, it is judged whether the operation mode of the system is the trial mode or not. If negative, a sequence of control operations as described below will not be carried out. If affirmative, the operation of a heat source device (not shown) is stopped at Step S2, and the operation of the blower 5 is started at Step S3. At Step S4, the number N of the dampers 9 of the air feeding adjusting devices which are connected to the main duct 6 is set. At Step S5, a first damper 9 (I = 1) is set at an initial opening angle, and the other dampers 9 are fully closed. The opening control of the dampers 9 are carried out by the damper control means 20. At Step S6, the actual air volume given by the blower 5 is measured by the air volume detector 19 and the air volume measurement means 21. At Step S7, the air feeding pressure difference caused by the blower 5 between the inlet and the outlet of the indoor unit 5 is measured by the pressure differential detector 18 and the pressure differential measurement means 22. At Step S8, it is judged whether the damper 9 (I = 1) should be set at a predetermined subsequent opening angle or not. If affirmative, the damper 9 (I = 1) is changed to the subsequent opening angle at Step S9. Then, the process returns to the Step S6, and the Steps S6 and S7 are carried out. The change in the opening angle is normally carried out at two stages or three stages though it varies depending on the kind of the damper 9. The other dampers 9 remain fully closed even when the opening angle is changed. The operations from the Step S6 through the Step S9 are repeated until the opening angle of the damper 9 has achieved a predetermined greatest set value.

On the other hand, when it is judged at the Step S8 that the damper 9 (I = 1) should not be set at a new opening angle (it means that the opening angle of the damper 9 has achieved the predetermined greatest set value), it is judged at Step S10 whether the damper 9 which has achieved the greatest set value is the Nth one or not. If negative, the number of one is added to the preceding data I to produce a new data I at Step S11. The process returns to the Step S5, and similar operations are repeated. In this way, such operations are carried out in sequence with respect to all dampers 9 from I = 1 through I = N, so that the operations are repeated N times.

If it is confirmed at the Step S10 that the damper 9 is the Nth one (I = N), the relationship among the opening angle, the air volume and the air feeding pressure difference of each damper 9 is calculated based on the data on these factors which have been obtained in the sequence of operations as stated above, thereby finding a tabulated relationship or formulated relationship with respect to the respective air feeding adjusting means. This calculation is carried out by the air volume calculation means 23.

Figure 4:
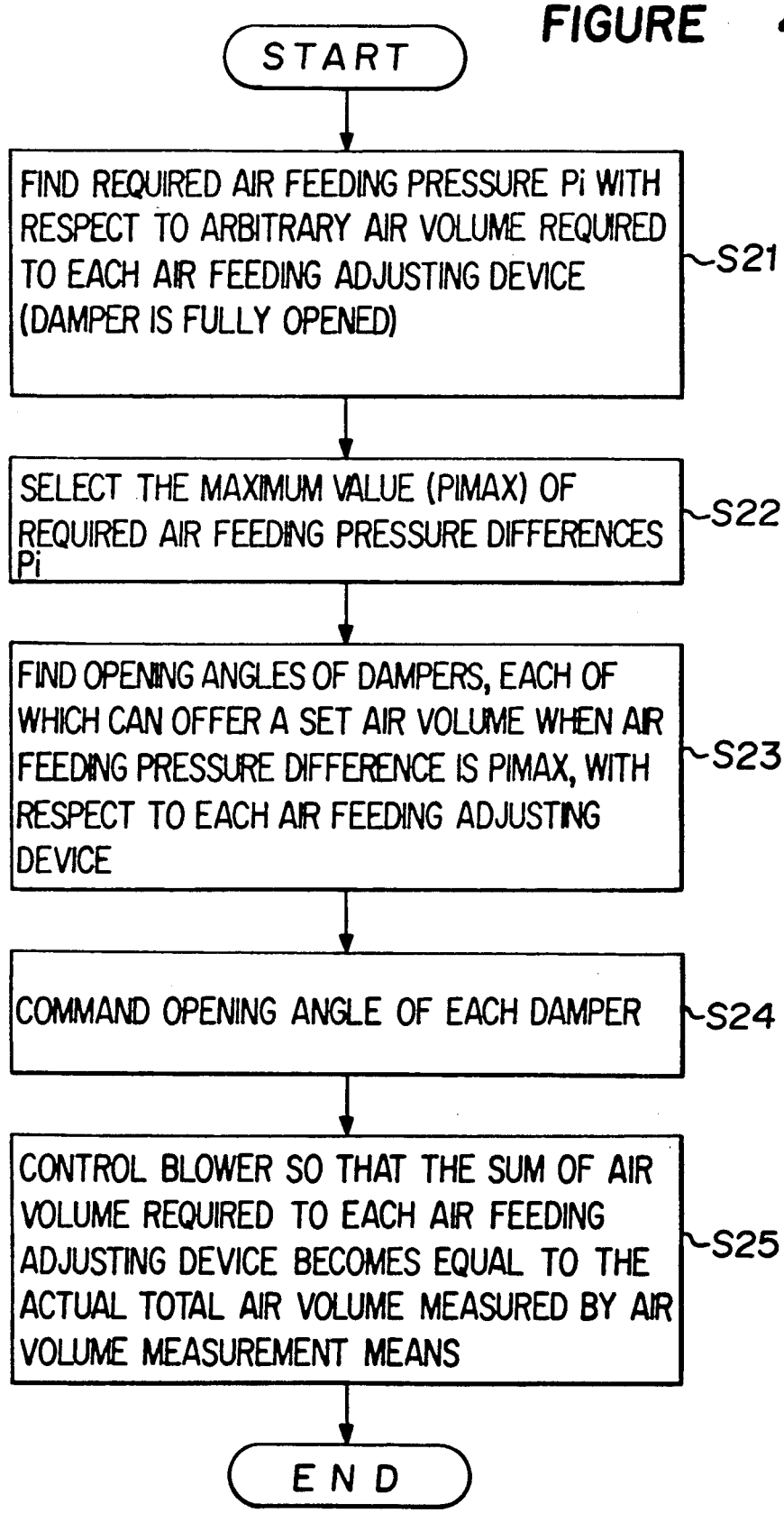
FIG. 4 is a flow chart showing the control operations of the first embodiment.

The control operations of the dampers 9 and the blower 5 which are carried out using the tabulated or formulated relationship among the opening degree, the air volume and the air feeding pressure difference with respect to the respective campers 9 will be briefly explained along the flow of the flow chart shown in FIG. 4. FIG. 4 is the flow chart showing the control operations of the first embodiment of the air conditioning system according to the present invention.

When the routine shown in FIG. 4 is called on the completion of the process at the Step S12 shown in FIG. 3, at Step S21, the air volume calculation means 23 utilizes the formulated or tabulated relationship for each air feeding adjusting devices to find required air feeding pressure difference Pi with respect to an arbitrary air volume required to each air feeding adjusting device at the time when the damper is fully opened. At the next Step S22, the maximum value (Pimax) of the required air feeding pressure differences Pi of the air feeding adjusting devices is selected. At Step S23, the opening angles of the dampers, each of which can offer a set air volume when the air feeding pressure difference Pi is Pimax, is found based on the formulated or tabulated relationship with respect to each air feeding adjusting devices. At this time, the opening angle of the damper 9 of the air feeding adjusting device whose required air feeding pressure difference Pi was Pimax at the Step 21 is of course in a fully opened state. Then, at Step S24, the damper opening angles which have been found in the Step S23 are commanded to the respective air feeding adjusting devices to adjust the opening angles of the dampers 9. After that, at Step S25, the blower 5 is controlled so that the sum of the air volume required to each air feeding adjusting device becomes equal to the air volume measured by the air volume measurement means. In this way, the sum of the required air volume is made to equal to the actual total air volume.

Such control operations can realize in an easier manner such air feeding control that air feeding power can be minimized as disclosed in e.g. Japanese Examined Patent Publication No. 47497/1985 which has been discussed as prior art.

As explained, such controls that the damper control means 20 changes the opening angle of every each damper 9 of the air feeding adjusting devices, and the other dampers are fully closed are carried out on the trial mode. The air volume given by the blower 5 at that time is measured by the air volume measurement volume 21 through the air volume detector 19. In addition, the air feeding pressure difference which is caused by the air feeding from the blower 5 in the indoor unit 2 is measured by the pressure difference measurement means 22 through the pressure differential detector 18. The air volume calculation means 23 finds the relationship among the opening angles of the damper 9, the air volume and the air feeding pressure difference based on information on these factors obtained by the damper control means 20, the air volume measurement means 21 and the pressure difference measurement difference 22, thereby tabulating or formulating the relationship. Such sequential operations are repeated by the number of the air feeding adjusting devices. Information on how to control the air feeding pressure difference and the opening angles of the dampers 9 in order to deliver a predetermined air volume to the branch ducts 7 is accumulated in sequence. In this way, the difference in the air paths of the ducts is detected in advance, the air volume of each terminal air volume control unit is indirectly estimated, and a suitable opening angle of each damper 9 to a required air volume is found.

On air conditioning or heating mode, the blower 5, and the opening angle of each damper 9 can be suitably controlled based on the information as described above to feed cooled or heated air to the rooms 1 to be air conditioned in a suitable and stable manner.

By the way, the trial operation (initialization) as described above is enough to be carried out only at the time of the trial adjustment for the air conditioning system. Most of the means which are required for this trial adjustment are not necessary for a normal operation. In particular, the pressure differential detector 18 is generally expensive, which can be an obstacle to a decrease in cost of the system.

Figure 5:
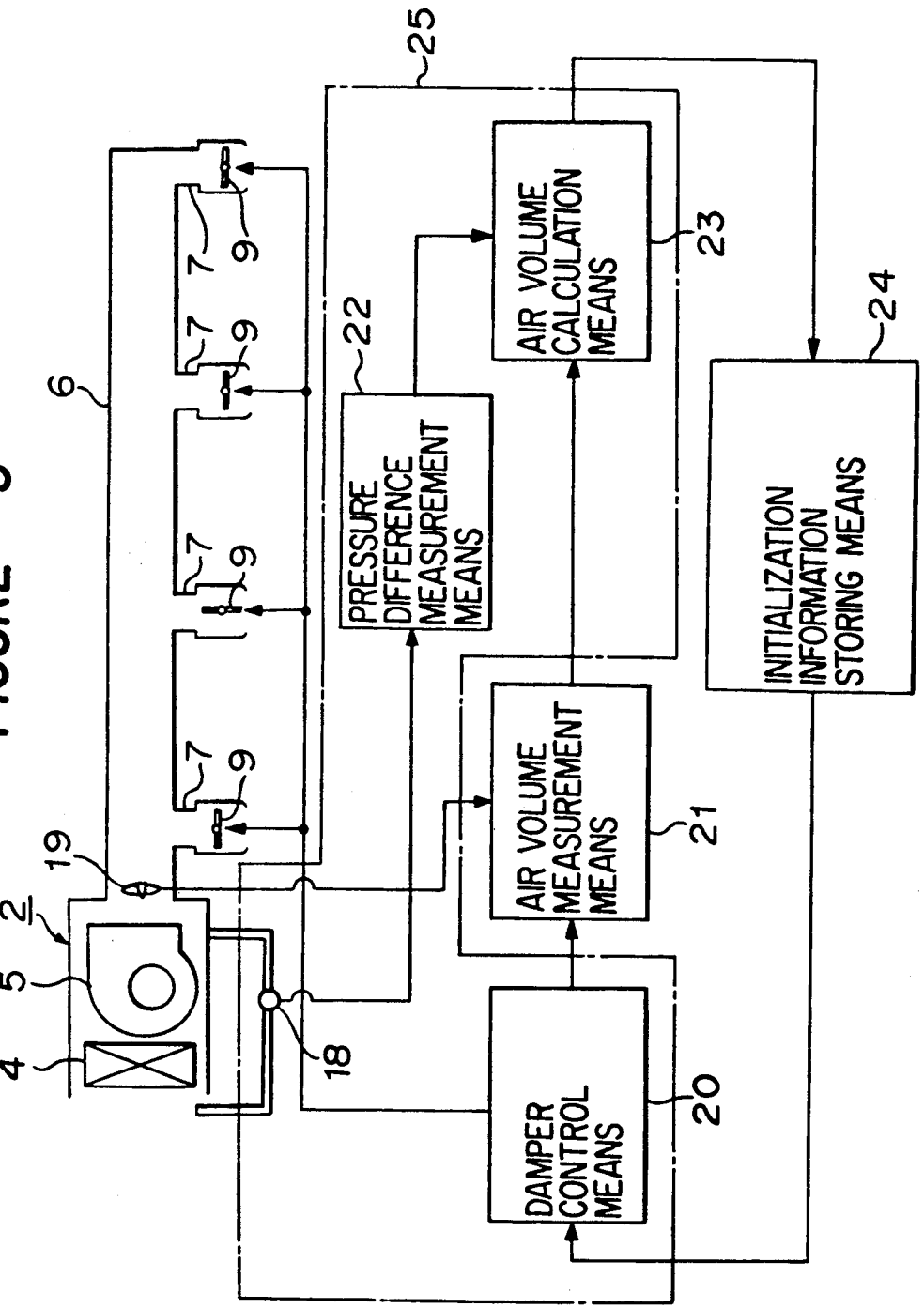
FIG. 5 is a schematic diagram showing the entire structure of a second embodiment of the air conditioning system according to the present invention.

In consideration of such circumstances, the present invention embraces a second embodiment of FIG. 5, which has two significant differences from the first embodiment previously described.

One difference between the modulator of FIG. 5 and the first embodiment is that there is initializing information storing means 24. Into the initialization information storing means 24 is stored and accumulated the tabulated or formulated initialization information on the air feeding, which has been found by the air volume calculation means 23 to see the air feeding resistance in the respective ducts. The other difference in the embodiment of FIG. 5 is that there is initialization information obtaining means 25 which is detachable from the air conditioning system of the present invention. The initialization information obtaining means is constituted by the damper control means 20, the pressure differential detector 18, the pressure difference measurement means 22 and the air volume calculation means 23 which are required only for the trial operation.

The initialization information obtaining means 25 may be normally owned by a contractor who has installed the system. The initialization information obtaining means 25 can be attached to the system at only the time of the trial operation to carry out the required initialization. The initialization information which has been obtained after the initialization information obtaining means 25 was attached to the system is stored in the initialization information storing means 24.

Such detachable structure can not only contribute to a decrease in cost of the entire system, but also utilize an expensive high pressure differential detector 18 to obtain the initialization information in a high-quality manner, thereby improving air flow control precesion.

We claim:

1. An air conditioning system comprising:
    a centralized air feeding device including an indoor unit with a heat exchanger in it, a main duct and branch ducts connected to the main duct, the centralized air feeding device heat exchanging air by the heat exchanger, and delivering the heat exchanged air to a plurality of rooms to be air conditioned by a blower through the main duct and the branch ducts;
    air feeding adjusting devices which are arranged in the respective branch ducts and include dampers, respectively, the air feeding adjusting devices adjusting the air volume of selectively cooled and heated air to the air conditioned rooms by controlling the opening angles of the dampers;
    damper control means for, on a trial mode, gradually changing the opening angle of the damper for each air feeding adjusting device while the other dampers are kept fully closed;
    air volume measurement means for detecting the air volume from the blower to measure the actual air volume;
    pressure difference measurement means for detecting a difference in pressure between the outlet air and the inlet air of the indoor unit to measure an air feeding pressure difference with respect to the actual duct system; and
    air volume calculation means for finding the relationship among the air volume passing through the respective air feeding adjusting devices, the opening angles of the respective dampers and the air feeding pressure difference, based on outputs from the pressure difference measurement means, the air volume measurement means and the damper control means, to find air feeding resistance in the respective ducts.

2. An air conditioning system according to claim 1, wherein the air volume calculation means is constituted so as to obtain initialization information on the air flow control, which is required to find the air feeding resistance in the respective ducts;
    and further comprising initialization information obtaining means which is constituted by the damper control means, the pressure difference measurement means and the air volume calculation means to obtain the initialization information, and which is detachable from the air conditioning system; and
    initialization information storing means for the initialization information.

* * * * *